(12) United States Patent
Geisler et al.

(10) Patent No.: US 10,409,890 B2
(45) Date of Patent: Sep. 10, 2019

(54) EVALUATION OF FORMULAS VIA MODAL ATTRIBUTES

(71) Applicant: Apple Inc., Cupertino, CA (US)

(72) Inventors: James M. Geisler, Pittsburgh, PA (US); Edward P. Hogan, Pittsburgh, PA (US); Zachariah N. Paine, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 56 days.

(21) Appl. No.: 15/862,252

(22) Filed: Jan. 4, 2018

(65) Prior Publication Data

US 2019/0205359 A1 Jul. 4, 2019

(51) Int. Cl.
| | | |
|---|---|---|
| G06F 17/17 | (2006.01) | |
| G06F 17/18 | (2006.01) | |
| G06Q 40/04 | (2012.01) | |
| G06F 3/0484 | (2013.01) | |
| G06F 17/24 | (2006.01) | |
| G06F 16/903 | (2019.01) | |

(52) U.S. Cl.
CPC ............ G06F 17/17 (2013.01); G06F 3/0484 (2013.01); G06F 16/90344 (2019.01); G06F 17/18 (2013.01); G06F 17/246 (2013.01); G06Q 40/04 (2013.01)

(58) Field of Classification Search
CPC .... G06F 17/17; G06F 16/90344; G06F 17/18; G06F 17/246; G06Q 40/04
USPC ........................................................ 708/200
See application file for complete search history.

(56) References Cited

U.S. PATENT DOCUMENTS

| | | | | |
|---|---|---|---|---|
| 5,303,146 | A * | 4/1994 | Ammirato | ............. G06F 3/0489 715/204 |
| 6,988,241 | B1 | 2/2006 | Guttman et al. | |
| 8,775,921 | B2 * | 7/2014 | Friedrich | .............. G06F 17/246 715/212 |
| 9,026,897 | B2 * | 5/2015 | Zarras | ................. G06F 3/04842 715/219 |
| 2017/0126772 | A1 | 5/2017 | Campbell et al. | |

OTHER PUBLICATIONS

Lkhamsuren et al.; "PadSpace: A new framework for the service federation of web resources"; Inf Syst Front (2013) vol. 15, pp. 111-132 (Published online: Sep. 6, 2011).

* cited by examiner

*Primary Examiner* — Tan V Mai
(74) *Attorney, Agent, or Firm* — Fletcher Yoder PC

(57) ABSTRACT

Embodiments are disclosed in which a process generates, receives, or both, via a graphical user interface (GUI) of a spreadsheet application, an evaluation statement. The evaluation statement includes a cell identifier, and the cell identifier specifies a modal reference cell that provides an indication of a modal attribute to be used in the evaluation statement. The indication of the modal attribute comprises a textual indicator related to the modal attribute, but has a format that is different than the modal attribute. The process evaluates the textual indicator to be used by the evaluation statement to determine a corresponding modal attribute and calculates a solution to the evaluation statement using the corresponding modal attribute as the modal attribute of the evaluation statement. The process displays the solution via the GUI.

25 Claims, 12 Drawing Sheets

EVALUATION OF FORMULAS VIA MODAL ATTRIBUTES

BACKGROUND

The present disclosure relates generally to generating evaluation statements, such as formulas within a table of an application, such as a spreadsheet application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Spreadsheet applications, as well as other types of applications, may use rows and columns of cells (such as arrays or tables of such cells) in which a user enters or manipulates data for calculation or presentation. Tables of cells used in such applications may range from a limited number of cells in simple or straightforward implementations to much larger arrays of cells in more complex scenarios. The tables may be used to relay and organize data to a user for various scenarios. Often an application may allow a user to define an evaluation statement (e.g., a formula) within a cell that references other cells within a spreadsheet or table. For example, a formula entered into a cell of a table may reference other cells of that table or of other tables for values that are used, evaluated, or manipulated by the formula in question. These expression statements oftentimes include function calls that use modal attributes, which are attributes specifically indicating one of an enumerated set of modes for the function. Typically, these modal attributes must precisely match one of a set of enumerated values programmed for use by the function. Unfortunately, however, evaluation statement designers (e.g., users of a spreadsheet application) may attempt to supply values that do not precisely match (e.g., only partially match) one of these enumerated values. This may result in expression statement output errors, causing frustration of the evaluation statement designers.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The current embodiments enable values that do not explicitly match an enumerated value of a modal attribute to be supplied in an expression statement (e.g., either through manual value entry or specification of cell references that contain values that do not adhere to the rigid formatting required by a function used in the expression statement). The non-matching values are mapped to an enumerated value of the modal attribute and the mapped to enumerated value is used as the value for the modal attribute of the function of the expression statement. This may greatly enhance expression statement generation, by enabling increased flexibility in expression statement design, by allowing non-precisely matched values to be used for modal attributes of a function that expects a precise value from a set of enumerated values for a modal attribute.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
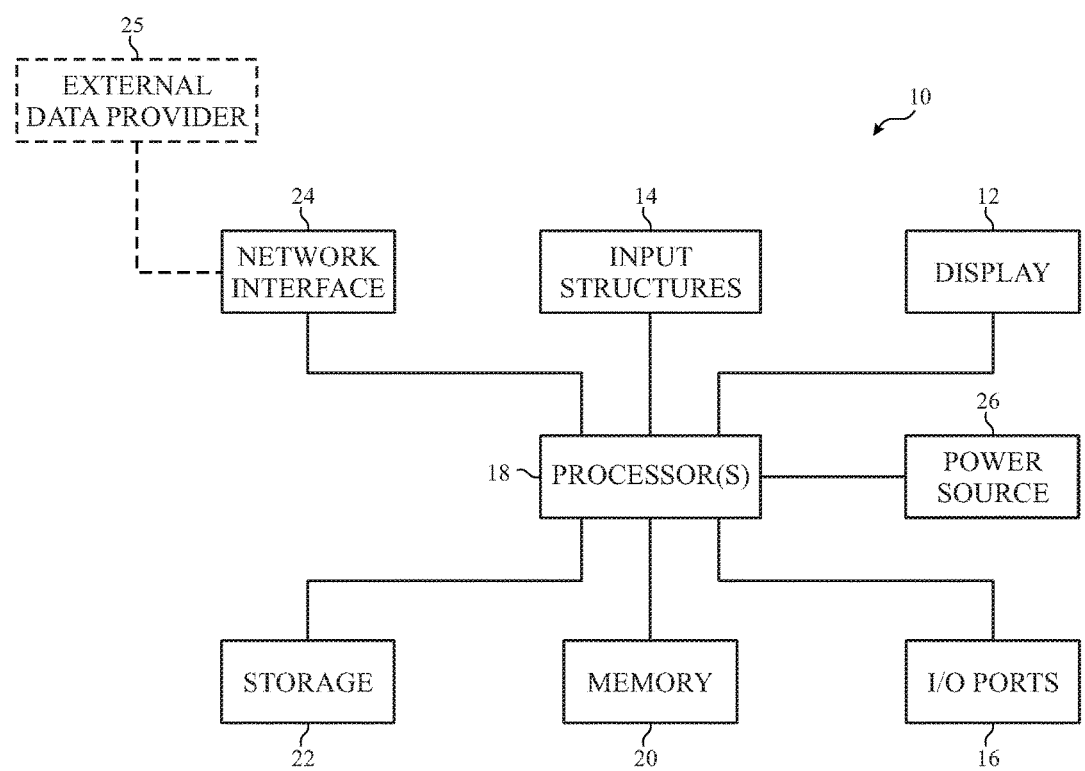
FIG. 1 is a block diagram of an electronic device that may use the techniques disclosed herein, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The present disclosure is generally directed to resolving issues that may arise in evaluation statements or formulas (such as formulas used to implement one or more defined functions) within a table when cells referenced by the evaluation statements or formulas are complex in nature. In practice, evaluation statements may require the user to specify one or more one or more attribute values in one or more reference cells to carry out a function. These attribute values oftentimes have to be in a very precise format, in order to provide instruction to a function of the expression statement. However, the precise formatting may not be present in the value inserted to the function as the attribute value. Accordingly, using the current techniques, attribute values that are not precisely formatted to match one of a set of enumerated values expected for the attribute by a function of the expression statement may be mapped to one of the enumerated values. Further, to ease the burden of formatting large spreadsheets, some or all of the evaluation statements (or portions of the evaluation statements) may be intelligently populated in accordance with the techniques disclosed herein. In addition, in certain implementations, a large portion of the evaluation statements used in the spreadsheet or the entire spreadsheet can be automatically populated via a drag-fill request to generate updated attributes for each of the evaluation statements (e.g., formulas).

Figure 2:
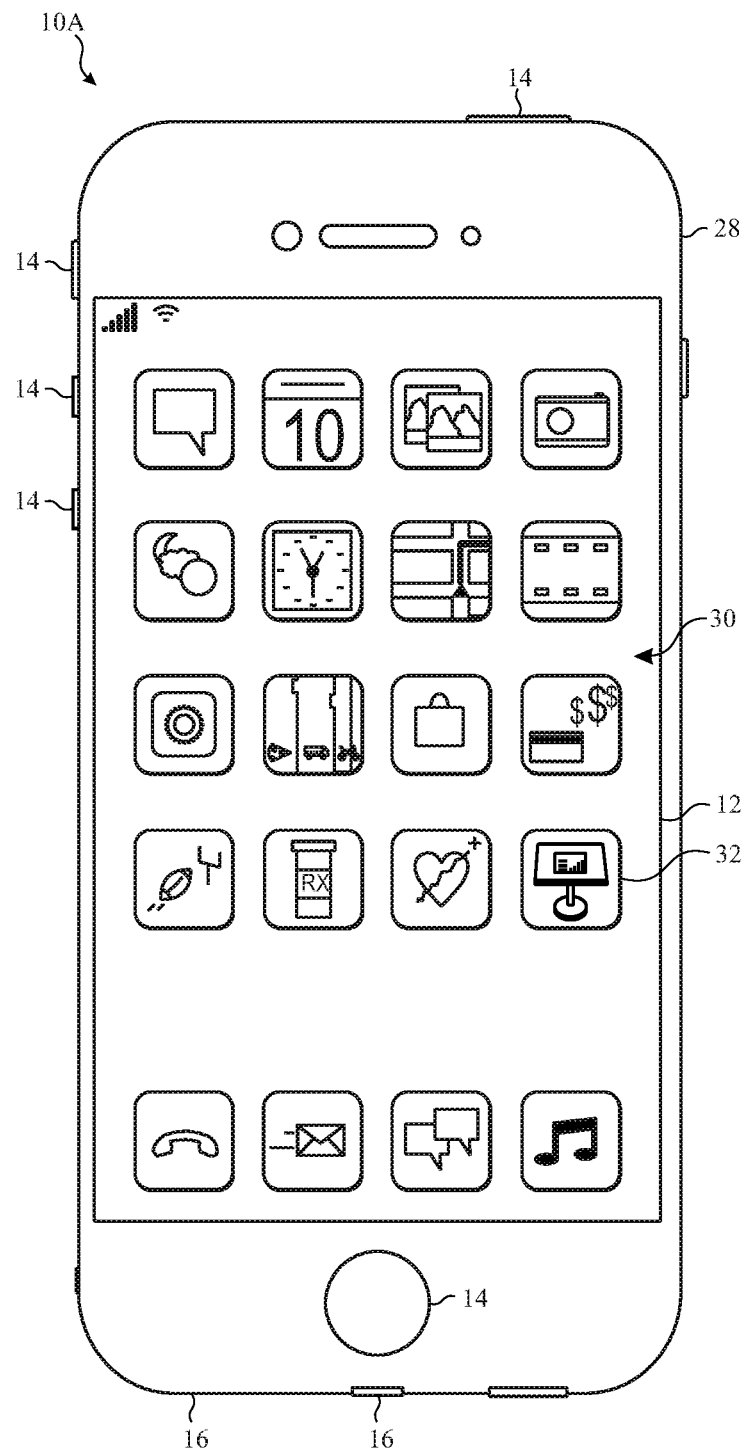
FIG. 2 is a front view of a handheld device, such as an iPhone® by Apple Inc., representing an example of the electronic device of FIG. 1.
Figure 3:
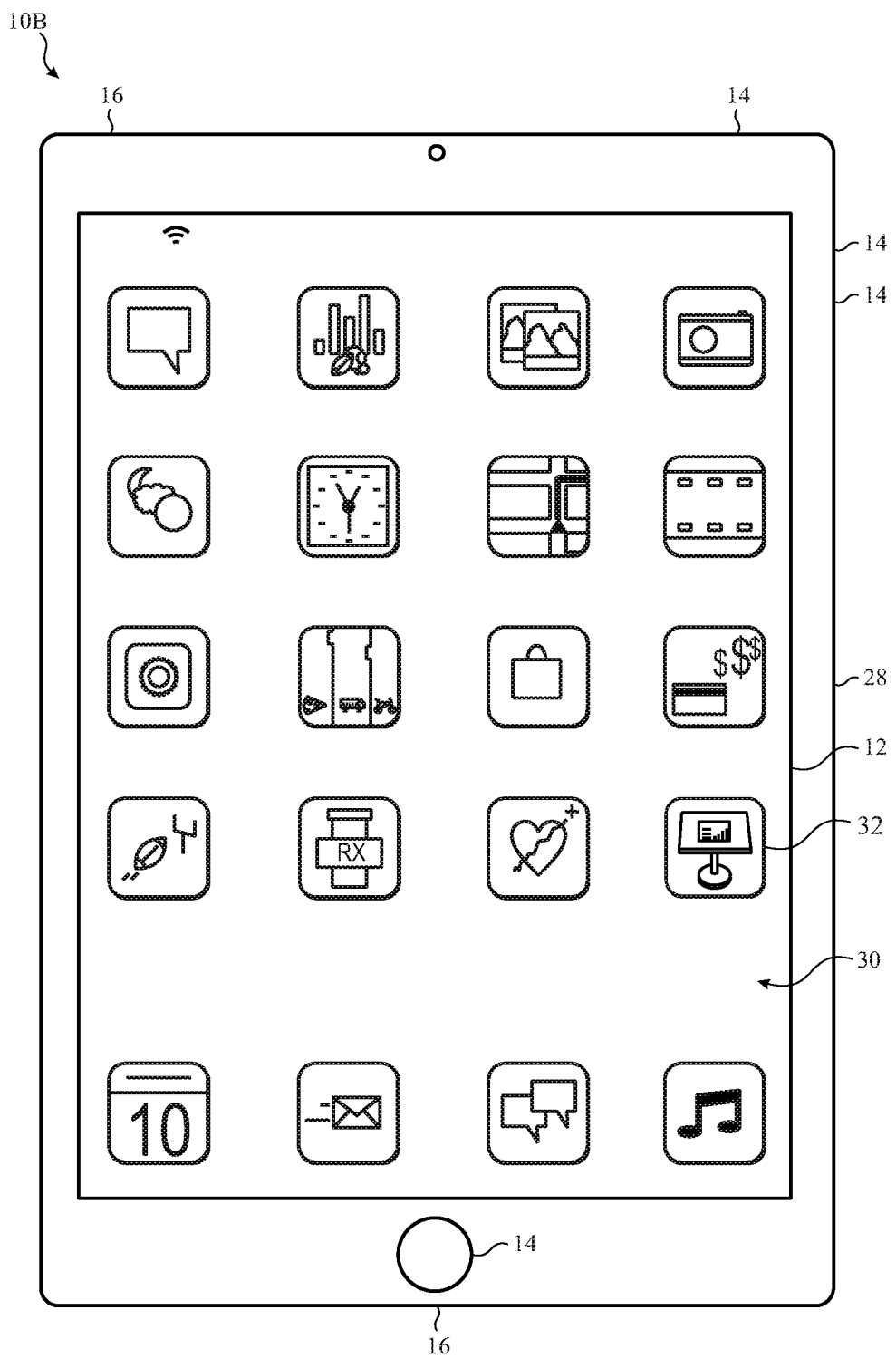
FIG. 3 is a front view of a tablet device, such as an iPad® by Apple Inc., representing an example of the electronic device of FIG. 1.
Figure 4:
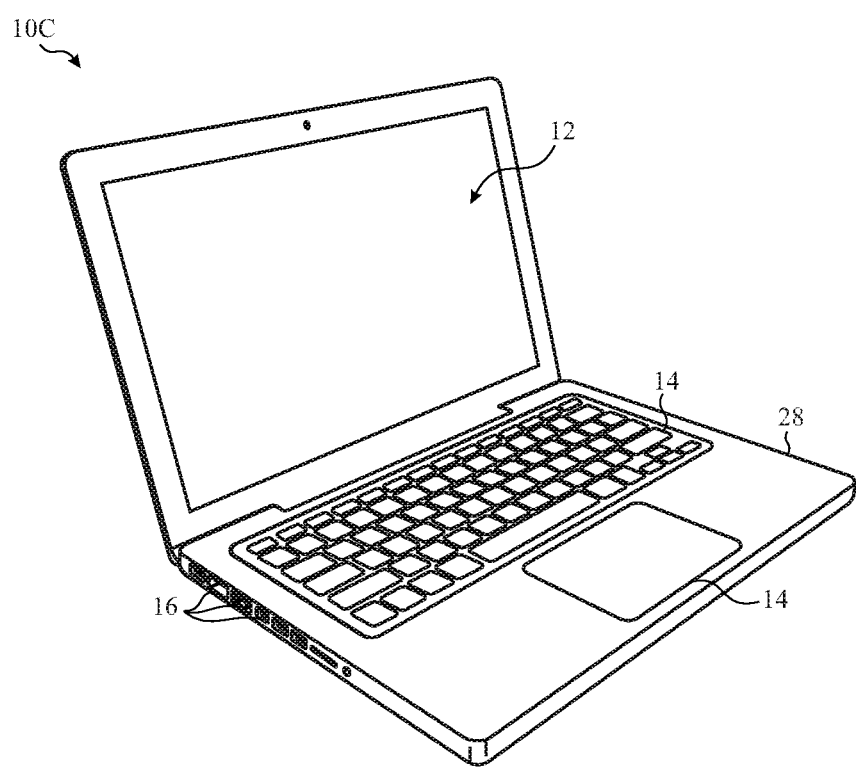
FIG. 4 is a perspective view of a notebook computer, such as a MacBook Pro® by Apple Inc., representing an example of the electronic device of FIG. 1.

A variety of suitable electronic devices may employ the techniques described herein when executing or interacting with a spreadsheet application or other application employing cells or tables of such cells. FIG. 1, for example, is a block diagram depicting various components that may be present in a suitable electronic device 10 that may be used in the implementation of the present approaches. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24 that may be communicatively coupled to an external data provider 25, and a power source 26. The various functional blocks shown in FIG. 1 may include hardware elements (including circuitry), software elements (including computer code stored on a non-transitory computer-readable medium) or a combination of both hardware and software elements. The external data provider 25 may provide data for expression statements executed by an application of the electronic device 10. For example, an expression statement may be executed via an application (e.g., a spreadsheet application) running on the processor(s) 18 of the electronic device 10. The evaluation statement may include a function call (e.g., a stock lookup function call) that retrieves information (e.g., stock information) from the external data provider 25. Upon reception of the information, the application may provide a result for the evaluation statement (e.g., stock lookup results). As will be discussed in more detail below, the processor(s) 18 may perform certain pre-processing steps prior to executing a function call. For example, attribute value mapping/formatting may be performed prior to performing a function call. Additionally and/or alternatively, pre-population of attribute values may be performed prior to performing a function call. In some embodiments, the processor(s) 18 may derive additional evaluation statements based at least in part upon an already generated expression statement. These techniques are described in detail below.

It should be noted that FIG. 1 is merely one example of a particular implementation and is intended to illustrate the types of components that may be present in the electronic device 10. Indeed, the various depicted components (e.g., the processor(s) 18) may be separate components, components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., Numbers® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch a spreadsheet application program (e.g., Numbers® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the spreadsheet application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Numbers® by Apple Inc.) running on the computer 10C.

With the preceding in mind, a variety of computer program products, such as applications or operating systems, may use or implement the techniques discussed below to enhance the user experience on the electronic device 10 and to improve the performance of the device when executing an application encoded as discussed herein. Indeed, any suitable computer program product that provides for the use or manipulation of cells within a table or spreadsheet, including the referencing of other cells from a given cell, may employ and benefit from some or all of the techniques discussed below. For instance, the electronic device 10 may store and run a spreadsheet application 34 (e.g., Numbers® from Apple Inc.). The spreadsheet application may be stored as one or more executable routines (which may encode and implement the actions described below) in memory and/or storage (FIG. 1). These routines, when executed, may cause control codes and logic as discussed herein to be implemented and may cause screens as discussed herein to be displayed on a screen of the electronic device or in communication with the electronic device.

Figure 5:
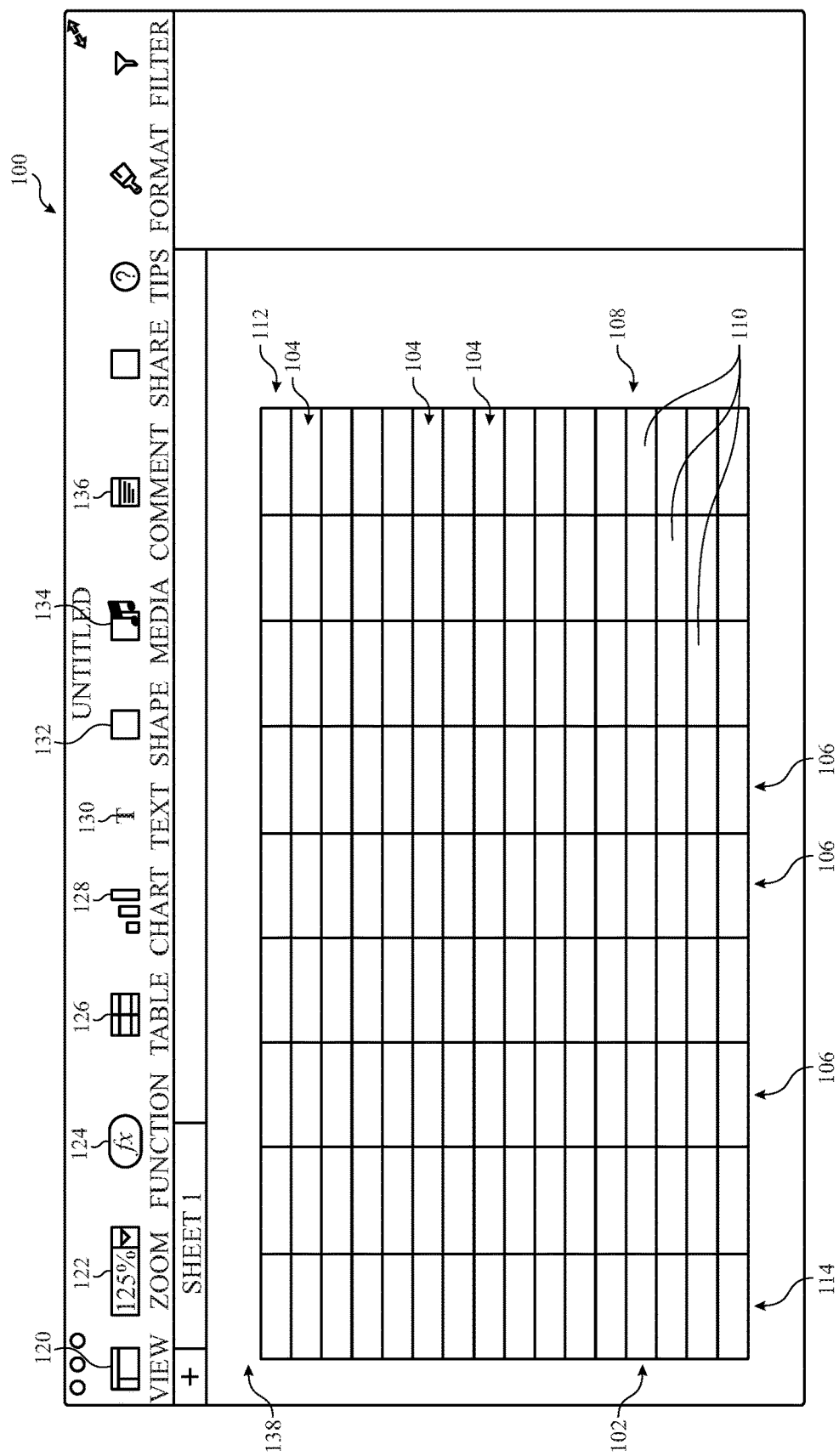
FIG. 5 illustrates an example of a graphical user interface (GUI) interface screen of a spreadsheet application in accordance with aspects of the present disclosure.

Turning to FIG. 5, an example of a spreadsheet application interface screen 100 is depicted which includes a table 102 having rows 104 and columns 106 of cells 110. In the depicted example, the table 102 is of finite size and displayed as an object (e.g., a graphical object) on the canvas 108 provided by the application. That is, the table 102 is not an "infinite" table composed of rows and columns of cells that fill the entire application display area in both horizontal and vertical dimensions. Such "infinite" table contexts provide an essentially limitless array of cells, though in such contexts there may in fact be a maximum number of rows and columns, this maximum number generally greatly exceeds any real world application or table size. Thus, in contrast to such "infinite" tables, the table 102 is of a limited, finite size and is handled as a table object on the canvas 108 provided by the application. Thus, in such an embodiment, more than one separate and distinct table object 102 may be provided or displayed on the canvas 108.

Upon selection of a cell 110 within the table 102, a user may be provided a prompt or other entry box by which text, numbers, formula, and so forth may be entered as the contents of a cell 110 or by which the existing contents of a cell 110 may be edited or modified. In the depicted example, the uppermost row 112 and leftmost column 114 may be set aside or visually distinguished to allow this row and column to display row or column headings or labels. Further, row and column address indicators or indexes may also be displayed that may be automatically populated with an index of column addresses or headers (e.g., A, B, C, D, and so forth) or, respectively, with an index of row addresses or headers (e.g., 1, 2, 3, 4, and so forth). In this manner an addressing scheme may be provided for each cell 110 within the table 102 such that individual cells may be identified by column and row address (e.g., A1, B3, D30, and so forth).

In addition, the interface screen 100 may include an interface bar 120 that includes buttons, menus, drop down boxes, and so forth that a user may interact with to invoke various functions within the spreadsheet application. By way of example, in the depicted screen 100, a magnification control 122, function entry button 124, table button 126, chart button 128, text box button 130, shape button 132, media button 134, and comment button 136 are provided. By interacting with these various controls, the user may insert a new table object 102 (such as via selection of the table button 126) on the displayed canvas area 108, select a function for use in a cell (such as via selection of the function button 124), insert a comment (such as via selection of the comment button 136), and so forth).

As discussed above, in certain instances a cell 110 within a table 102 may contain an evaluation statement. The evaluation statement may include a function. In some situations the evaluation statement may reference other cells in the table 102 or in other table objects present on the canvas 108 or in other spreadsheets. Examples of such evaluation statements might include mathematical functions (including functions to determine a sum or difference over a range of cells, stock functions, financial functions, valuation functions, etc.) and statistical functions (such as functions to determine an average, median, maximum, minimum, or mode, over a range of cells). Similarly, such evaluation statements may also include functions related to the layout, searching, referencing, or redirection of the contents of a cell for various display or calculation purposes.

In practice, a user may provide an instruction to the application to calculate or evaluate the evaluation statements. Certain evaluation statements may require the user to specify one or more one or more attribute values to carry out a function (e.g., STOCK, ACCRINT) associated with the evaluation statement. Provided attribute values may not precisely match attribute values allowed by a function. Further, inputting some or all of the attribute values may be time consuming for the user. As discussed herein, in some embodiments, non-precisely matched attribute values may be matched and/or mapped to a precisely matched attribute value that replaces a supplied attribute value. This may result in more flexibility for function calls, resulting in fewer error results from the function call execution.

Further, in some embodiments, in order to facilitate more efficient formatting of the evaluation statements in the spreadsheet application, some or all of the evaluation statements may be intelligently populated via a process to improve spreadsheet productivity. In certain embodiments, the evaluation statements (e.g., formulas, stock function) may be generated by determining a current cell context including a row position and a column position of the selected cell (e.g., identifying a row header associated with the row position and a column header associated with the column position). A cell identifier may be set as one of the row header or the column header to derive a corresponding modal attribute for the evaluation statements (e.g., formulas, stock function), and an attribute (e.g., a stock name attribute) for the evaluation statement may be set as one of the row header or the column header, as explained in further detail below.

In some embodiments, additional expression statements may be generated based upon previously generated expression statements. For example, a dragging action within a spreadsheet application from a cell that includes an expression statement may result in automatic generation of additional expression statements, where the attribute values are automatically populated based upon a reference location of the new dragged-to cells in relation to the dragged-from cells. This feature is described in detail below.

Flexible Attribute Values

Figure 6:
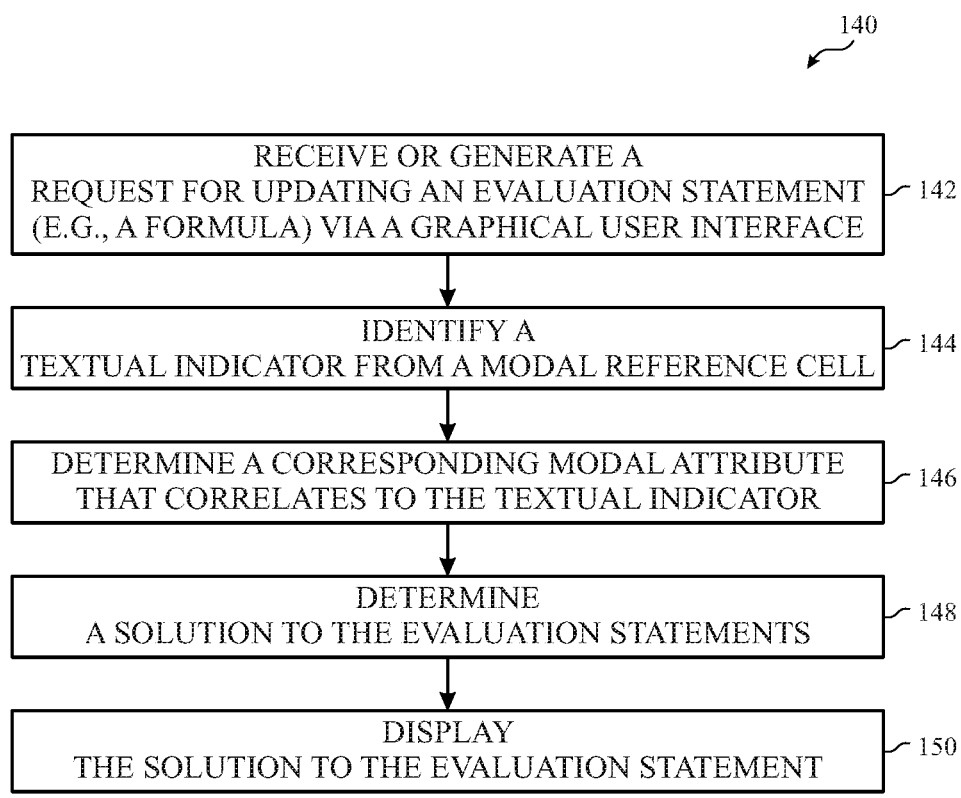
FIG. 6 depicts a process flow diagram depicting control logic of a process for evaluating an evaluation statement, in accordance with aspects of the present disclosure.

With the preceding in mind, and to facilitate explanation, FIG. 6 illustrates a process 140 for generating evaluation statements using modal attributes, in accordance with aspects of the present disclosure. The evaluation statement (e.g., the formula) may include functions, such as stock functions (e.g., STOCK, CURRENCY), financial functions (e.g., ACCRINT, IPMT, IRR), valuation functions (e.g., CAPM), location functions, or any other functions. In some cases, the functions may use one or more modal attributes. As used herein, modal attributes refer to attributes of a function with an enumerated set of values that may be used. For example, a stock lookup function, may include a modal attribute that defines what type of data to return. The modal attribute may have an enumerated list of attribute values, such as "price", "volume", "name", "dividend_yield", etc., where any values outside of the enumerated list of attribute values results in an invalid attribute value. In some embodiments, the enumerated list of attribute values is case sensitive, while in others the enumerated list of attribute values are not case sensitive.

Attribute values may be manually entered into an evaluation statement and/or may be retrieved via a referenced cell. Accordingly, in some instances, the evaluation statement may include attributes that may need to be updated prior to solving the evaluation statement. For example, the evaluation statement may include a reference to pull attributes from other locations (e.g., other cells, other tables, etc.). Accordingly, the process 140 includes receiving and/or generating a request for updating an evaluation statement (e.g., a formula) via the graphical user interface 30 (block 142).

In other words, in some instances the evaluation statement includes one or more cell identifiers that specify one or more modal reference cells that with an indicator provide an indication of one or more modal attributes to use in the evaluation statement.

To update the evaluation statement, the process 140 identifies (block 144) an indicator (e.g. a textual indicator) from a modal reference cell. In one example relating to the stock function in the Numbers application, the textual indicator is "Dividend Yield," which is determined from the modal reference cell, C1, which is referenced in the expression statement.

As may be appreciated, modal attributes may require precise value matching, as unexpected values (e.g., values outside the enumerated list of acceptable attribute values) may result in a function execution error. Accordingly, after the textual indicator is identified (e.g., either via manual entry or via accessing a referenced cell's data), the process 140 evaluates or determines the modal attribute to be used by the evaluation statement by determining a modal attribute that correlates to the textual indicator (block 146). The process 140 may identify the corresponding modal attribute by mapping and/or matching the textual indicator to a modal attribute of an enumerated list of modal attributes. In the context of the stock function, the indicator to be mapped and/or matched to a modal attribute may include variations of one of the modal attribute values, including but not limited to: abbreviations, spellings, punctuation, capitalizations, and so forth. A string search of the textual indicator may search for these variations in the textual indicator, to find a best matching modal attribute value for the textual indicator. For example, for the modal attribute of "Dividend_Yield", the textual indicator could include, but is not limited to: Div. Yield, Div_Yield, div_yield, dividend_yield, div yield, dividend yield, and so forth. The string search may search for these variations and determine that "Dividend_Yield" is the appropriate value of the enumerated set of available values for the modal attribute.

Upon mapping the indicator to the corresponding modal attribute, the process 140 determines a solution to the evaluation statement (e.g., the formula) (block 148). The process 140 may use the corresponding modal attribute in the evaluation statement, in place of the indicator value. This may ensure that one of the enumerated modal attributes is provided in the evaluation statement, rather than a freeform indicator value.

The process 140 then displays (block 150) the solution to the evaluation statement. The above process 140 for evaluating the evaluation statement may be further understood with reference to FIG. 7.

Figure 7:
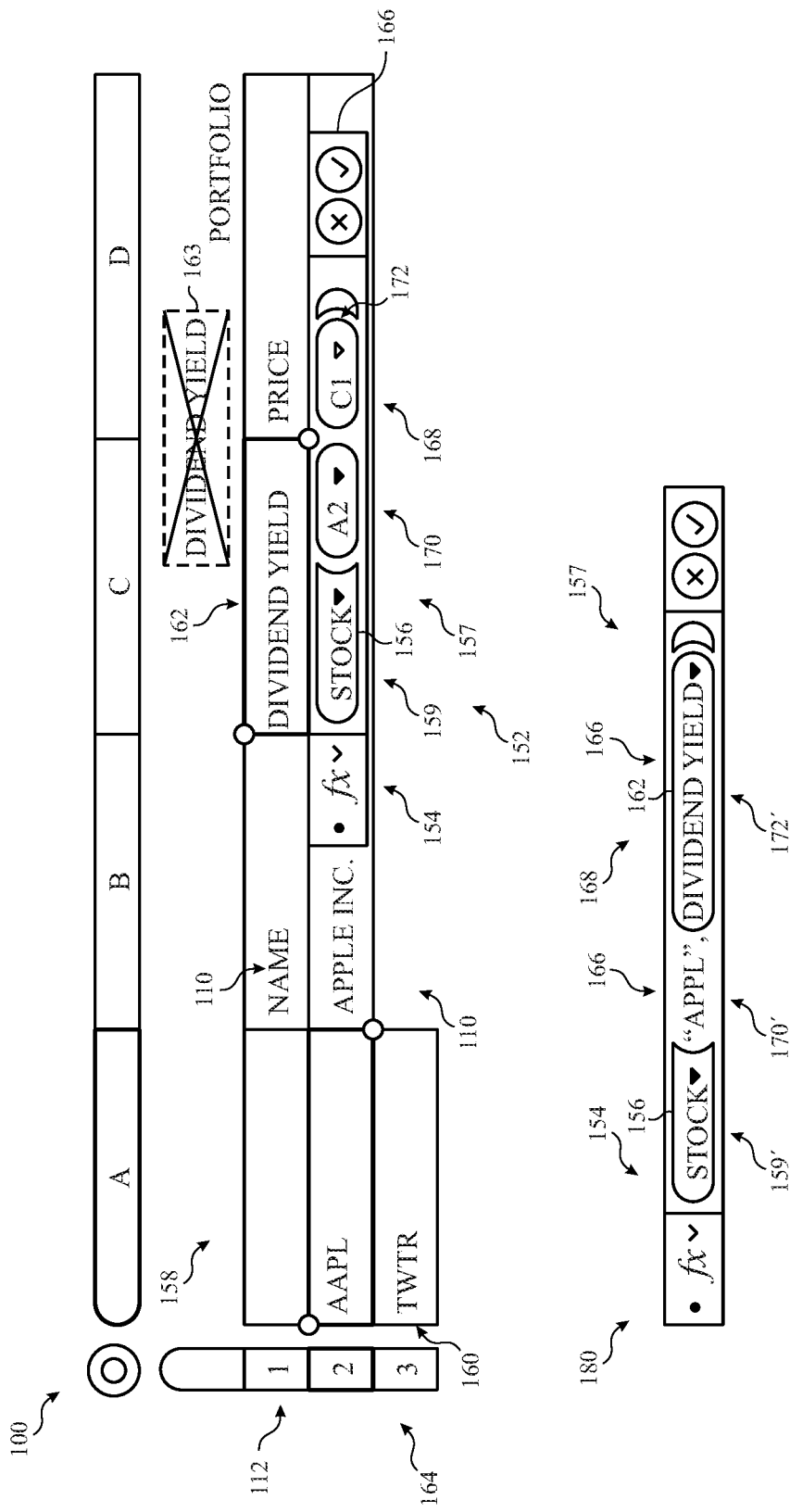
FIG. 7 illustrates an example of the spreadsheet application GUI interface screen illustrating an evaluation statement evaluated in the spreadsheet application in accordance with aspects of the present disclosure.

FIG. 7 illustrates an example of the spreadsheet application interface screen 100 illustrating an evaluation statement evaluated in the spreadsheet application in accordance with aspects of the present disclosure. As discussed above, the interface screen 100 includes a structured table 102. The structured table 102 is defined, in part by the uppermost row 112 (e.g., the header row 158) and the leftmost column (e.g., the header column 160). Some of the cells 110 in the table 102 may contain one or more evaluation statements.

For example, an editing window 152 depicts an evaluation statement 154 (e.g., a formula) in an editing mode. The evaluation statement (e.g., a formula) 154 includes a function 156 that processes data in accordance with a set of attributes 157. In some instances, the attributes 157 may contain references to cells (e.g., cell identifiers 166) where a value is stored for use as the attribute 157. For example, a first attribute 170 in the evaluation statement 154 of FIG. 7 indicates that cell A2 stores a value to be used as the first attribute 170. Similarly, a second attribute 172 of the evaluation statement 154 indicates that cell C1 stores a value to be used as the second attribute 172.

In this example, the evaluation statement 154 uses a stock function 159. The stock function 159 uses a freeform search value as the first attribute 170. The stock function 159 uses one of a set of enumerated modal attribute values as the second attribute 172. Accordingly, the second attribute 172 is a modal attribute.

Starting with the first attribute 170, in the current embodiment, the header column 160 includes certain search criteria 164 that may be useful in the evaluation statement 154. In the illustrated embodiment, the search criteria 164 includes stock ticker names or stock abbreviations associated with various company names (e.g., AAPL for Apple, Inc., TWTR for Twitter, Inc., etc.). The search criteria 164 may vary and may include other updatable search criteria including, but not limited to, non-financial data, such as geographical data, weather data, or other data for use with non-financial functions that can be updated. As described above, the evaluation statements 154 include one or more cell identifiers 166 (e.g., referenced cells) to specify the one or more cells that include values to be used as the attribute. In the illustrated embodiment, a first cell indicator references cell A2 of the table 102. The value associated with cell A2, here "AAPL" is used as the first attribute 170 of the evaluation statement 154.

Turning now to a discussion of the second attribute 172, the second cell indicator 172 references cell C1 of the table 102. As mentioned above, the second attribute 172 is a modal attribute that uses one of a set of enumerated modal attribute values. However, the value associated with cell C1 is not one of the set of enumerated modal attribute values, but instead is an indicator (e.g., textual indicator 162) that does not explicitly match the formatting of one of the enumerated modal attribute values. Accordingly, the textual indicator 162, here "Dividend Yield", provides an indication of the modal attribute to be used in the evaluation statement 154, but is not explicitly formatted as one of the enumerated set of modal attribute values.

As will be discussed in more detail below, the textual indicator 162 may provide a more desirable formatting, but may break the evaluation statement 154 when not formatted in a manner expected by the function 156 (e.g., is not one of the enumerated attribute values). Accordingly, the indicator 162 may be mapped to the formatting of the modal attribute prior to use in the evaluation statement 154. The one or more textual indicators 162 are provided in contrast to values 163 that have a rigid formatting that explicitly match a modal attribute to be used in the evaluation statement 154. In other words, in embodiments where no mapping and/or matching to modal values is present, values 163 that explicitly match the modal attribute must be used. According, the explicit modal attribute "Dividend_Yield" must be supplied. In contrast, in embodiments where the textual indicators 162 can be mapped and/or matched to a modal attribute, less-rigid formatting may be used. For example, "Dividend Yield" may be mapped to the modal attribute "Dividend_Yield".

In some embodiments, an alternative editing window 180 may be utilized to edit the evaluation statement 154. Here, the alternative editing window 180 is used by the user to edit the evaluation statement 154 by manually inserting the indicator 162, instead of referencing a cell. Accordingly, as illustrated, the modal attributes 168 may be entered in text format, rather than referencing certain cells 110 or providing an explicit modal attribute. For example, the first attribute 170' corresponds to cell A2 of the table 102, but is referenced by referring to the contents of the cell A2 (here "AAPL"). Similarly, the second attribute 172' correlates to cell C1 of the table 102, but is referenced by referring to a freeform text entry that does not explicitly match formatting of a modal attribute (here "Dividend Yield").

The modal attributes 168 (e.g., the second modal attribute 172) may then be updated by mapping textual indicators 162 to a modal attribute from an enumerated list of modal attributes. To map the textual indicators 162 to the modal attributes 168 to the enumerated list of modal attributes, the textual indicator 162 is first evaluated. In the preceding example, one of the textual indicators 162 is "Dividend Yield." The textual indicator 162 is evaluated by accessing a library to access a list of the modal attribute values. That is, the library may contain a set of expected modal attribute values for use with the evaluation statement 154. In some embodiments, the expected modal attribute values may include variations of the modal attributes 168, including but not limited to, abbreviations, alternative spellings, misspellings, variations in capitalizations, and so forth. For example, the library may contain the following enumerated list of modal attributes for "Dividend Yield": Div. Yield, Div_Yield, div_yield, dividend_yield, div yield, dividend yield, etc. In other embodiments, such derivations may be determined based upon a string search.

By accessing the library of expected modal attributes and/or performing the string search, the process 140 evaluates the textual indicators 162 by performing a matching sequence. That is, the process 140 attempts to match a partial string between the textual indicator 162 and the set of expected modal attributes (i.e., the list of enumerated modal attributes). The process 140 may define a match between the textual indicator 162 and a first expected modal attribute of the set of enumerated modal attributes when a threshold of matching is met. In some embodiments, the textual indicator 162 may have an associated textual frequency. Textual frequency may be defined as a matched number of characters, a percentage of matched characters, a closest match, and so forth between the textual indicator 162 and the enumerated list of modal attributes. The threshold of matching may be met when the textual frequency exceeds a target. In one embodiment, the textual indicator 162 that has the highest textual frequency is matched to the modal attribute of the enumerated list of modal attributes. Alternatively, the user may disable this feature of the process 140 so that the match between the textual indicator 162 and the first expected modal attribute of the set of enumerated modal attributes occurs only when there is an exact match.

When the textual indicator 162 and the first expected modal attribute of the set of expected modal attributes are matched to the threshold, the process 140 then sets or assigns an expected modal attribute to the modal attribute of the set of enumerated modal attributes that has the closest match. In the preceding example, if the user entered "Div Yield," rather than "Dividend Yield," the process 140 would match the "Div Yield" variation of the modal attribute 168 to the enumerated modal attribute value of "Dividend Yield." The process 140 then uses the expected modal attribute value (here "Dividend Yield") to solve the evaluation statement 154. The matching process and subsequent solving of the evaluation statement 154 may be further understood with reference to FIGS. 8-9.

By matching indicators to modal attribute values, additional flexibility in evaluation statement generation is provided. This may result in a much improved user experience, as user preferred values may be used to specify attribute values, while reducing a number of erroring function calls caused by unexpected modal attribute values.

Auto-Population of Evaluation Statements and/or Attribute Values

Figure 8:
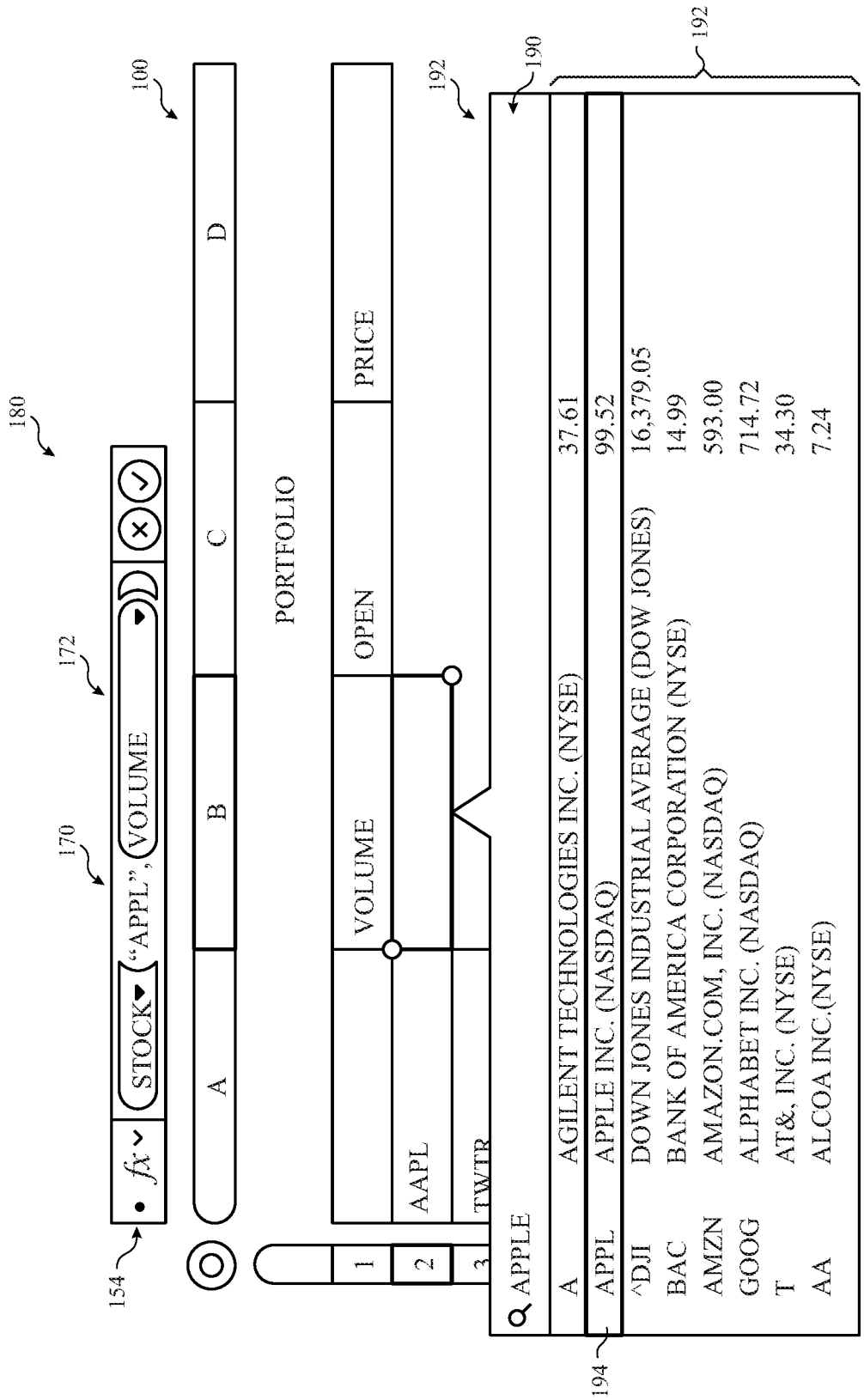
FIG. 8 illustrates an example of the GUI of FIG. 7 further illustrating an evaluation statement GUI that is pre-populated based in part on a row header value and/or a column header value in accordance with aspects of the present disclosure.

Having discussed flexible function calls, the discussion now turns to auto-population features within an expression statement. FIG. 8 illustrates an example of the spreadsheet application interface screen 100, illustrating auto-population of attributes of the evaluation statement 154 to be evaluated in the spreadsheet application in accordance with aspects of the present disclosure. In the illustrated embodiment, the alternative editing window 180 is utilized by the user to edit the evaluation statement 154, which may include pre-populated attributes based upon features of the spreadsheet. Here, for example, the header cell A2 value may be used to pre-populate a search field 190 of a stock information pop-up box 192. Thus, the search field 190 is pre-populated with the value "APPLE" from header cell A2. The stock information pop-up box 192 may include a search results list 194 that provides results associated with the search field 190 and, optionally, results that appear regardless of information in the search field 190.

A user may select a particular one of the results from the results list 194, which may associate an expected format of value (e.g., a stock symbol in this example) with the evaluation statement 154 of the cell B2. The selected value from the results list 194 to associate with cell A2, in this example is "AAPL", which is used as the first attribute 170 of the evaluation statement 154.

Figure 9:
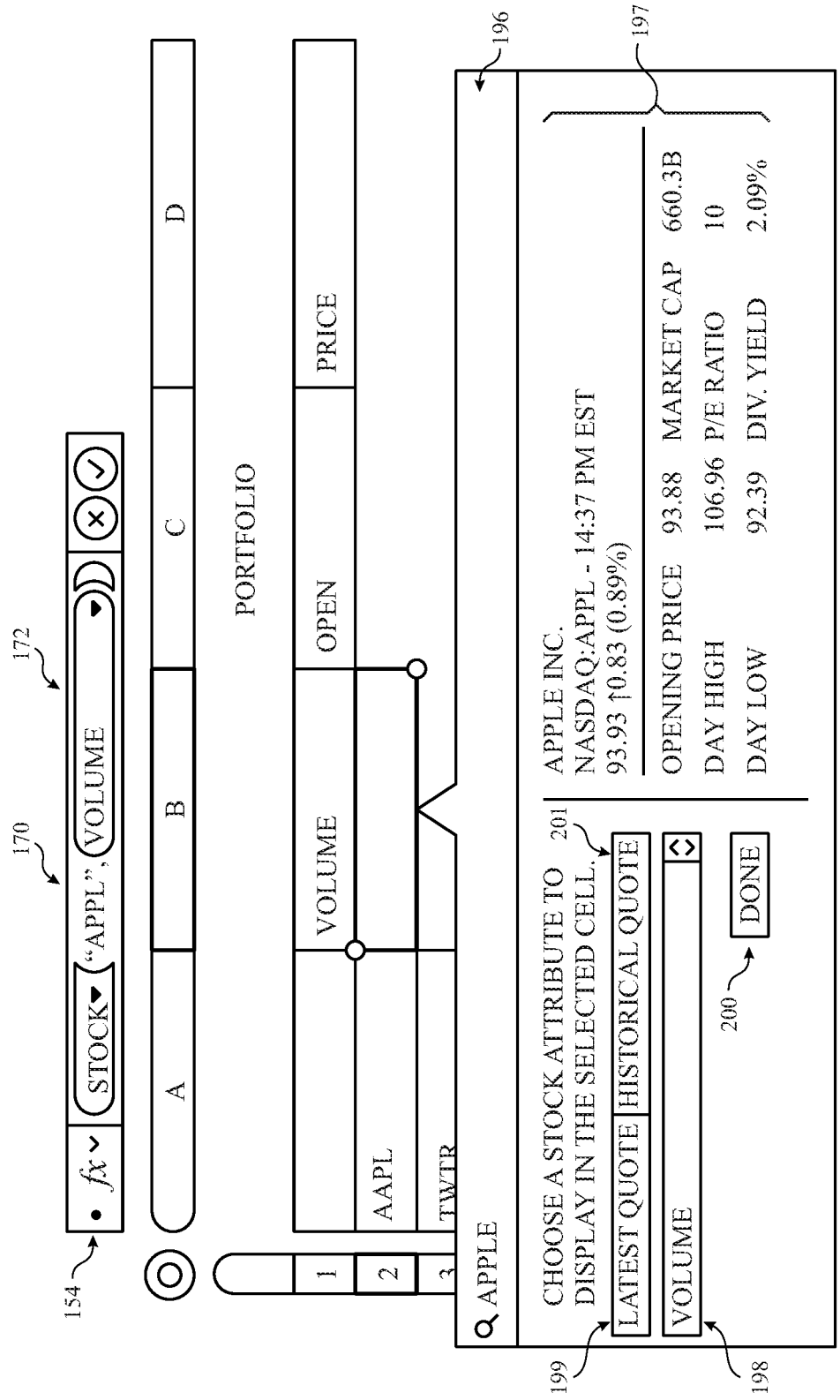
FIG. 9 illustrates an example of a new GUI that is populated based in part on the values selected in FIG. 8 to access data in accordance with aspects of the present disclosure.

Accordingly, a new GUI 196 may be provided that indicates "AAPL" as the search symbol, as shown in FIG. 9. In the GUI 196, data 197 (e.g. stock information) may be retrieved and presented (e.g., by accessing or retrieving the data, identified in part upon the data in the search field in real-time). The data 197 may include current data when selection 199 (e.g., latest quote) is selected or historical data when selection 201 (e.g., historical quote) is selected.

A modal attribute value to use in an evaluation statement of the underlying cell (e.g., cell B2) may be selected via a modal attribute value selector 198. In the GUI 196, the modal attribute selector 198 may be pre-populated based upon a spatially-related header cell. For example, header cell B1 may provide an indication of a modal attribute value to pre-populate in the modal attribute selector 198. As described above, the value associated with cell B1, in some situations, may not be one of the set of enumerated modal attributes. Rather, the value associated with cell B1 may be an indicator (e.g., textual indicator 162) that does not explicitly match the formatting of one of the enumerated modal attributes. The textual indicator 162 (here "Volume") provides an indication of the expected modal attribute (here "volume") to be used in the evaluation statement 154, but is not explicitly formatted as one of the enumerated set of modal attributes. Accordingly, the process 140 may be used, when necessary, to map the textual indicator 162 to the corresponding modal attribute value from an enumerated list of modal attribute values. The process 140 evaluates the textual indicators 162 by performing a matching sequence. Here, the process 140 matches the textual indicator 162 (here "volume") to the appropriate modal attribute of the enumerated list of modal attributes 168 (here "Volume"). Upon matching the textual indicator 162 and the second modal attribute 172, the process 140 proceeds to pre-populate the modal attribute selector 198.

In some embodiments, the evaluation statement 154 may be generated upon an indication to generate the evaluation statement. For example, the user could select the "Done" option 200, indicating that each of the proper selections is made and the evaluation statement should be generated. The evaluation statement 154 is then generated, using the modal attribute value selected by the modal attribute value selector 198 as the second cell indicator 172. From there, the evaluation statement 154 may be solved.

Automated Evaluation Statement Generation

Figure 10:
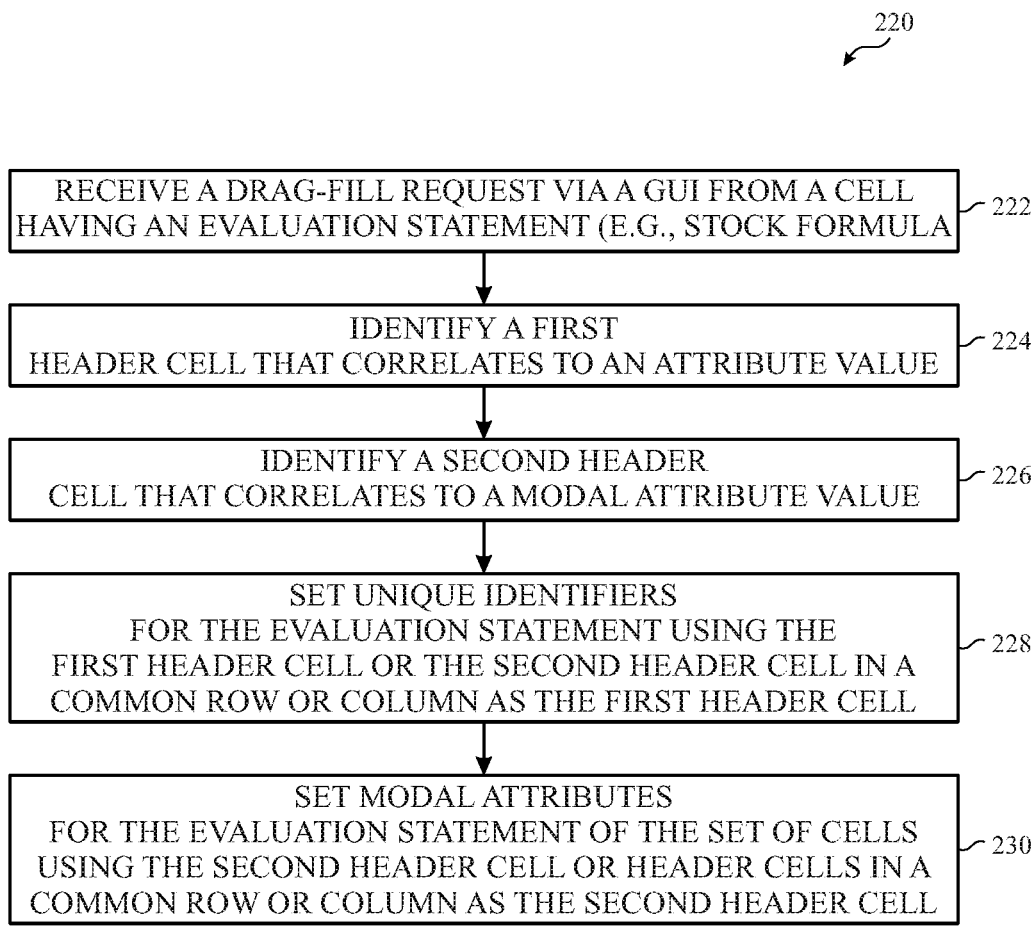
FIG. 10 depicts a process for filling adjacent cells in the spreadsheet application in response to a drag indication, in accordance with aspects of the present disclosure.

Until now, the discussion of the present techniques has pertained to utilization of evaluation statements 154, as specified for a particular cell 110. Inputting the evaluation statements 154 one at a time may be time consuming for the user. As discussed herein, in one implementation, in order to facilitate more efficient formatting of the evaluation statements 154 in the spreadsheet application, some or all of the evaluation statements in the cells 110 may be filled across the spreadsheet, to fill in adjacent cells 110 of the spreadsheet application, as explained further with reference to FIG. 10. FIG. 10 depicts a process 220 for filling adjacent cells in the spreadsheet application in response to a drag indication, in accordance with aspects of the present disclosure.

The process 220 includes receiving a drag-fill request via a GUI from the cell 110 having an evaluation statement 154, such as a stock function 159 (block 212). The process 220 further includes identifying a first header cell that correlates to an attribute value (block 224). In one example, the attribute value correlates to an identifier of the stock (e.g., a stock symbol, such as AAPL for Apple, Inc., TWTR for Twitter, Inc., etc.).

The process 220 includes identifying a second header cell that correlates to the modal attribute value (block 226). As mentioned above, examples of the modal attribute value 168 may include volume, price, etc.

The process 220 includes setting attribute values for new evaluation statements 154 created in response to the drag-fill request, by using the first header cell in a spatially-related row and/or the second header cell in a spatially-related column as the first header cell in response to the drag-fill request (block 228). In other words, the process 220 identifies the first header cell as being associated with the first attribute 170 value and establishes that values of spatially-related header cells may be used to fill the first attribute of evaluation statements of cells that are similarly spatially-related. Thus, when a first cell includes an evaluation statement that includes a first header column cell reference and/or value as its first attribute, an evaluation statement for a cell below the first cell may use the header column cell reference and/or value of the header column cell below the first header column cell as its first attribute. Similarly, when a first cell includes an evaluation statement that includes a first header column cell reference and/or value as its first attribute, an evaluation statement for a cell above the first cell may use the header column cell reference and/or value of the header column cell above the first header column cell as its first attribute.

Further, when a first cell includes an evaluation statement that includes a first header row cell reference and/or value as its first attribute, an evaluation statement for a cell to the right of the first cell may use the header row cell reference and/or value of the header column cell to the right of the first header row cell as its first attribute. Similarly, when a first cell includes an evaluation statement that includes a first header row cell reference and/or value as its first attribute, an evaluation statement for a cell to the left of the first cell may use the header row cell reference and/or value of the header row cell to the left of the first header column cell as its first attribute.

These spatially-related features may also work in diagonal relatedness. For example, while a diagonally positioned cell may not be directly positioned below or next to the first cell, the horizontal and/or vertical positioning of the cell to the first cell may still be used to identify a proper attribute.

The process 220 includes setting modal attributes for the evaluation statement 154 of the set of sells using the second header cell(s) in a spatially-related row or a spatially-related column as the second header cell in response to the drag-fill request (block 230), similar to the manner discussed above with regard to block 228. Specifically, the process 220 identifies the second header cell that is spatially-related to a header cell used in the first cell of a source evaluation statement being dragged from. The spatial-relatedness of the source evaluation statement with the new evaluation statement defines the spatially-related header cell to reference in the new evaluation statement.

The header cell may include the textual header 162 that is associated with the second header cell that can be used to update and fill the next cell by mapping the textual indicator 162 to a corresponding modal attribute 168, as described above with reference to FIGS. 7-9. As mentioned above, the textual indicator may need to be matched to one of an enumerated set of modal attribute values before evaluation of the evaluation statement. Accordingly, the techniques discussed above may be performed to match to an expected modal attribute.

Figure 11:
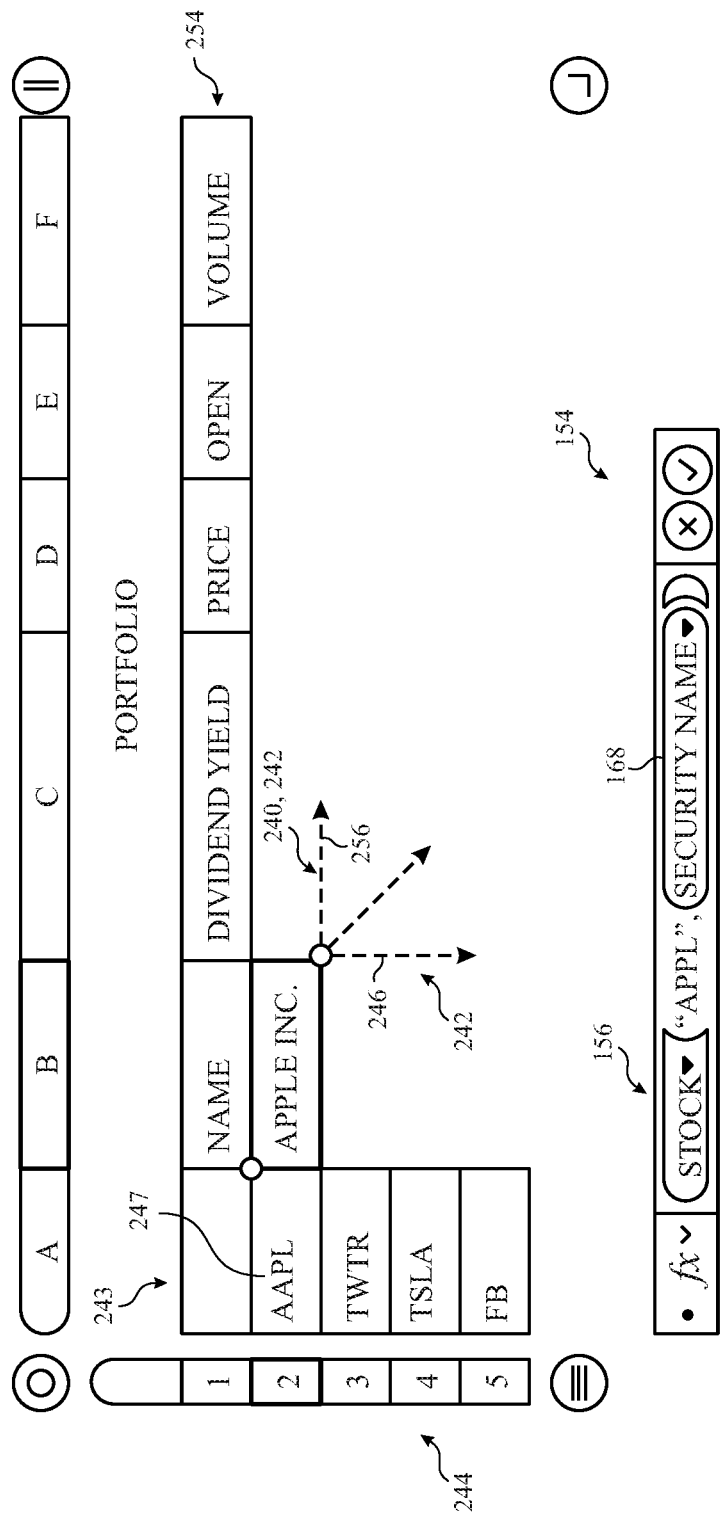
FIG. 11 illustrates an example of a screen illustrating the drag indication of FIG. 10 of the spreadsheet application in accordance with aspects of the present disclosure.
Figure 12:
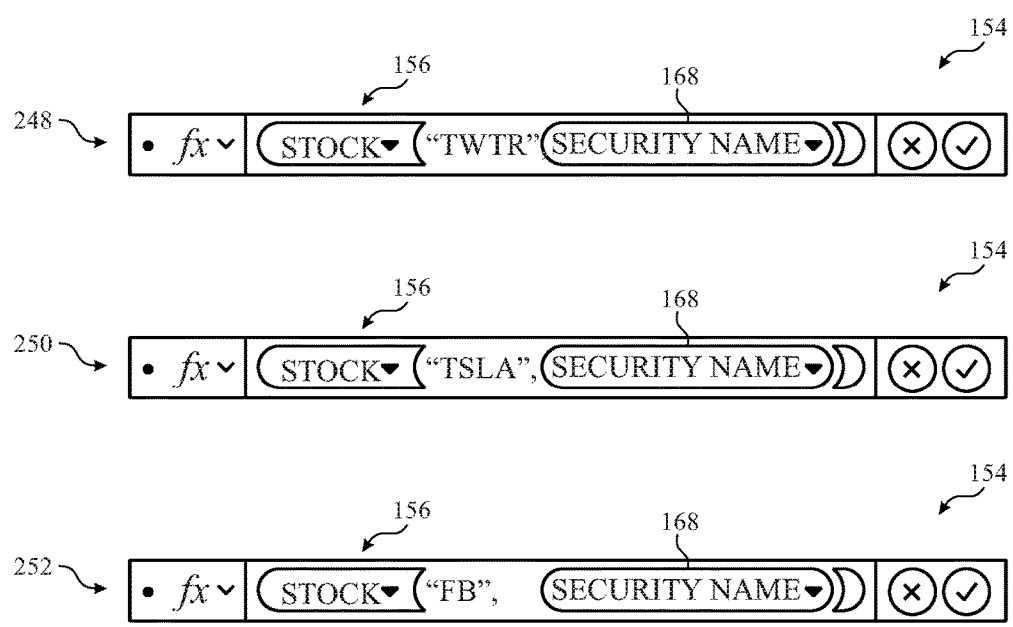
FIG. 12 illustrates updated modal attributes in accordance with the received drag indication of FIG. 11 in accordance with aspects of the present disclosure.

FIGS. 11-12 illustrate an example of a screen illustrating the drag-fill indication of FIG. 10 of the spreadsheet application in accordance with aspects of the present disclosure. In the illustrated embodiment, the user performs a dragging motion as indicated by arrow 240 to provide a drag-fill indication 242. By performing the dragging motion, the dragged-to cells of the table 102 can be filled out by identifying a first header cell 243 correlating to an attribute value 244 and setting the attribute values 244 for newly created evaluation statements of the drag operation, as described above.

In the illustrated embodiment, the attribute value 244 is an abbreviation of a company name to identify a stock (e.g., AAPL for Apple, Inc., TWTR for Twitter, Inc., etc.), which is found in header cell A2, which is spatially-related to the cell B2, which stores the source evaluation statement 247 (e.g., the evaluation statement being dragged from in the drag operation). In response to the dragging motion (e.g., in a downward direction 246), the attribute values 244 for the cells 110 below cell B2 are updated and filled in using the header cells that are similarly spatially-related. For example, the evaluation statement 154 associated with the cell B2 outputs the value "Apple Inc." when the evaluation statement 154 is solved. When the dragging motion is performed, the evaluation statement 154 associated with cell B3 (indicated by arrow 248) is updated to include "TWTR" for the first attribute. This occurs because the cell A3 is spatially-related to cell A2 (e.g., the cell used for the first attribute of the evaluation statement in cell B2) similarly to the spatial-relatedness between the source cell B2 and the destination cell B2 (e.g., the cell being dragged to in the drag operation), in that these cells are spatially-related by being one cell below the original cell. Accordingly, when the evaluation statement 154 associated with cell B3 is solved, the value of cell B3 would read "Twitter, Inc.".

Similarly, in response to the dragging motion (e.g., in a downward direction 246), the attribute values 244 for the cells B4 and B5, indicated by arrows 250 and 252, respectively, are updated and filled in with "TSLA" and "FB", respectively. As such, the evaluation statement 154 associated with the cell B4 outputs the value "Tesla Inc." when the evaluation statement 154 is solved, while the cell B5 outputs the value "Facebook Inc." when the evaluation statement 154 associated with cell B5 is solved.

As described above, the process 220 may identify the second header cell as having the textual header 162 that is associated with the second header cell that can be used to update and fill the next cell by mapping the textual indicator 162 to a corresponding modal attribute 168. In other words, in response to the dragging motion (e.g., in a right direction 256), the textual indicator 162 is mapped to the expected modal attribute 168. By way of example, in response to the dragging motion, the adjacent cells 110 are updated in a similar spatially-related manner. For example, the evaluation statement 154 associated with cell D2 would be updated to reference the identifier AAPL (e.g., because D2 and B2 are in the same row 2) and the modal attribute 168 of Price (e.g., because the header cell B1 used for the modal attribute of the evaluation statement in cell B2 is two columns to the left of the header cell D1, as the source cell B2 is two cells to the left of destination cell D2). The value in header cell D1 may be matched to an enumerated modal attribute value "price", which is used as the modal attribute value for an evaluation statement stored in cell D2. Accordingly, when the evaluation statement 154 for cell D2 is solved, cell D2 would display the price of Apple's stock.

In the cell E3, the evaluation statement 154 associated with cell E3 would be updated to reference the identifier TWTR and the modal attribute 168 value of Open. When the evaluation statement 154 for cell E3 is solved, cell E3 would display the opening price of Twitter's stock. In the cell F4, the evaluation statement 154 associated with cell F4 would be updated to reference the identifier TSLA and the modal attribute 168 of Volume. When the evaluation statement 154 for cell F4 is solved, cell F4 would display the number shares of Tesla's stock traded in a day.

The specific embodiments described above have been shown by of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. For example, while the discussion herein described a function with a first search attribute and a second modal attribute, any number and type of attributes may be processed using the techniques provided herein.

What is claimed is:

1. A tangible, non-transitory, machine-readable medium, comprising machine-readable instructions that, when executed by one or more processors, cause the one or more processors to:

generate, receive, or both, via a graphical user interface (GUI) of a spreadsheet application, an evaluation statement, the evaluation statement comprising a cell identifier, the cell identifier specifying a modal reference cell that provides an indication of a modal attribute to be used in the evaluation statement wherein the indication of the modal attribute comprises a textual indicator related to the modal attribute, but having a format that is different than the modal attribute;
evaluate the textual indicator to be used by the evaluation statement to determine a corresponding modal attribute;
calculate a solution to the evaluation statement using the corresponding modal attribute as the modal attribute of the evaluation statement; and
display the solution via the GUI.

2. The machine-readable medium of claim 1, comprising machine-readable instructions that, when executed by the one or more processors, cause the one or more processors to:
evaluate the textual indicator to determine the corresponding modal attribute, by:
accessing a library defining a set of expected modal attributes of the evaluation statement;
performing a partial string matching analysis between the textual indicator and the set of expected modal attributes of the evaluation statement; and
setting an expected modal attribute of the set of expected modal attributes as the corresponding modal attribute, when a partial string match between the expected modal attribute and the textual indicator meets a matching threshold, is the largest partial string match with respect to other expected modal attributes of the set of expected modal attributes, or both.

3. The machine-readable medium of claim 1, comprising machine-readable instructions that, when executed by the one or more processors, cause the one or more processors to:
evaluate the textual indicator to determine the corresponding modal attribute, by:
accessing a set of expected modal attributes of the evaluation statement;
translating the textual indicator into one of the set of expected modal attributes of the evaluation statement; and
setting the one of the set of expected modal attributes of the evaluation statement as the corresponding modal attribute.

4. The machine-readable medium of claim 3, wherein the textual indicator comprises a textual frequency and the one of the set of expected modal attributes of the evaluation statement comprises a numerical value associated with the textual frequency.

5. The machine-readable medium of claim 1, wherein the evaluation statement comprises a stock formula that retrieves requested stock information identified based at least in part upon the modal attribute.

6. The machine-readable medium of claim 5, comprising machine-readable instructions that, when executed by the one or more processors, cause the one or more processors to:
generate the stock formula, by:
determining a current cell context, the current cell context comprising a row position and a column position of a currently selected cell;
identify a row header for the row position and a column header for the column position;
setting the cell identifier as one of the row header or the column header to derive the corresponding modal attribute for the stock formula;
setting a stock name attribute for the stock formula as one of the row header or the column header;
performing the stock formula to obtain a stock lookup result; and
presenting, via the GUI, the stock lookup result.

7. The machine-readable medium of claim 6, comprising machine-readable instructions that, when executed by the one or more processors, cause the one or more processors to:
upon selection of the currently selected cell, present a stock lookup pop-over box, the stock lookup pop-over box comprising the stock lookup result.

8. The machine-readable medium of claim 7, wherein the stock lookup pop-over box comprises a modal attribute selector for the stock formula that is pre-populated with the corresponding modal attribute for the stock formula.

9. The machine-readable medium of claim 8, wherein the stock lookup pop-over box comprises a historical quote selector that, when selected, performs the stock formula against historical data and presents historical results for the stock formula in the stock lookup pop-over box.

10. The machine-readable medium of claim 5, comprising machine-readable instructions that, when executed by the one or more processors, cause the one or more processors to:
receive a drag-fill request via the GUI from a cell comprising the stock formula, the drag-fill request comprising an indication of a set of cells to fill with stock formulas corresponding to the stock formula;
identify a first header cell of the cell comprising the stock formula that correlates to a unique identifier of the stock formula, the unique identifier identifying a stock to lookup via the stock formula;
identify a second header cell of the cell comprising the stock formula that correlates to the modal attribute of the stock formula;
set unique identifiers for stock formulas of the set of cells using the first header cell or header cells in a common row or column as the first header cell; and
set modal attributes for the stock formulas of the set of cells using the second header cell or header cells in a common row or column as the second header cell.

11. The machine-readable medium of claim 1, comprising machine-readable instructions that, when executed by the one or more processors, cause the one or more processors to:
present, via a evaluation statement editor of the GUI, the evaluation statement in a evaluation statement format comprising the cell identifier.

12. The machine-readable medium of claim 1, comprising machine-readable instructions that, when executed by the one or more processors, cause the one or more processors to:
present, via a evaluation statement editor of the GUI, the evaluation statement in an evaluation statement format comprising the modal attribute.

13. The machine-readable medium of claim 12, wherein the evaluation statement format comprises a modal attribute selector pre-populated with the modal attribute.

14. A processor-based system, comprising:
a display;
a memory storing one or more routines; and
a processing component configured to execute one or more routines stored in the memory, wherein the one or more routines, when executed by the processing component, cause acts to be performed comprising:
generating, receiving, or both, via a graphical user interface (GUI) of a spreadsheet application, an evaluation statement, the evaluation statement comprising a cell identifier, the cell identifier specifying a modal reference cell that provides an indication of a modal attribute to be used in the evaluation statement, wherein the indication of the modal attribute comprises a textual indicator related to the modal attribute, but having a format that is different than the modal attribute;

evaluating the textual indicator to be used by the evaluation statement to determine a corresponding modal attribute;

calculating a solution to the evaluation statement using the corresponding modal attribute as the modal attribute of the evaluation statement; and displaying the solution via the GUI.

15. The processor-based system of claim 14, wherein evaluating the textual indicator to determine the corresponding modal attribute comprises:

accessing a library defining a set of expected modal attributes of the evaluation statement;

performing a partial string matching analysis between the textual indicator and the set of expected modal attributes of the evaluation statement; and setting an expected modal attribute of the set of expected modal attributes as the corresponding modal attribute, when a partial string match between the expected modal attribute and the textual indicator meets a matching threshold, is the largest partial string match with respect to other expected modal attributes of the set of expected modal attributes, or both.

16. The processor-based system of claim 14, wherein evaluating the textual indicator to determine the corresponding modal attribute comprises:

accessing a set of expected modal attributes of the evaluation statement;

translating the textual indicator into one of the set of expected modal attributes of the evaluation statement; and setting the one of the set of expected modal attributes of the evaluation statement as the corresponding modal attribute.

17. The processor-based system of claim 14, wherein the textual indicator comprises a textual frequency and the one of the set of expected modal attributes of the evaluation statement comprises a numerical value associated with the textual frequency.

18. The processor-based system of claim 14, wherein the evaluation statement comprises a stock formula that retrieves requested stock information identified based at least in part upon the modal attribute.

19. The processor-based system of claim 18, comprising generating the stock formula by:

determining a current cell context, the current cell context comprising a row position and a column position of a currently selected cell;

identifying a row header for the row position and a column header for the column position;

setting the cell identifier as one of the row header or the column header to derive the corresponding modal attribute for the stock formula;

setting a stock name attribute for the stock formula as one of the row header or the column header;

performing the stock formula to obtain a stock lookup result; and presenting, via the GUI, the stock lookup result.

20. A processor-implemented method for generating an evaluation statement, comprising:

generating, receiving, or both, via a graphical user interface (GUI) of a spreadsheet application, an evaluation statement, the evaluation statement comprising a cell identifier, the cell identifier specifying a modal reference cell that provides an indication of a modal attribute to be used in the evaluation statement, wherein the indication of the modal attribute comprises a textual indicator related to the modal attribute, but having a format that is different than the modal attribute;

evaluating the textual indicator to be used by the evaluation statement to determine a corresponding modal attribute;

calculating a solution to the evaluation statement using the corresponding modal attribute as the modal attribute of the evaluation statement; and displaying the solution via the GUI.

21. The processor-implemented method of claim 20, wherein evaluating the textual indicator to determine the corresponding modal attribute comprises:

accessing a library defining a set of expected modal attributes of the evaluation statement;

performing a partial string matching analysis between the textual indicator and the set of expected modal attributes of the evaluation statement; and setting an expected modal attribute of the set of expected modal attributes as the corresponding modal attribute, when a partial string match between the expected modal attribute and the textual indicator meets a matching threshold, is the largest partial string match with respect to other expected modal attributes of the set of expected modal attributes, or both.

22. The processor-implemented method of claim 20, wherein evaluating the textual indicator to determine the corresponding modal attribute comprises:

accessing a set of expected modal attributes of the evaluation statement;

translating the textual indicator into one of the set of expected modal attributes of the evaluation statement; and setting the one of the set of expected modal attributes of the evaluation statement as the corresponding modal attribute.

23. The processor-implemented method of claim 20, wherein the textual indicator comprises a textual frequency and the one of the set of expected modal attributes of the evaluation statement comprises a numerical value associated with the textual frequency.

24. The processor-implemented method of claim 20, wherein the evaluation statement comprises a stock formula that retrieves requested stock information identified based at least in part upon the modal attribute.

25. The processor-based system of claim 24, comprising generating the stock formula by:

determining a current cell context, the current cell context comprising a row position and a column position of a currently selected cell;

identifying a row header for the row position and a column header for the column position;

setting the cell identifier as one of the row header or the column header to derive the corresponding modal attribute for the stock formula;

setting a stock name attribute for the stock formula as one of the row header or the column header;

performing the stock formula to obtain a stock lookup result; and presenting, via the GUI, the stock lookup result.

* * * * *